United States Patent [19]
Lawson

[11] 3,907,379
[45] Sept. 23, 1975

[54] CONTROL VALVE FOR ANTI-SKID AIR BRAKING SYSTEM

[75] Inventor: Thomas Gordon Lawson, Birmingham, England

[73] Assignee: Girling Limited, Birmingham, England

[22] Filed: Feb. 12, 1974

[21] Appl. No.: 441,875

[30] Foreign Application Priority Data
Feb. 13, 1973  United Kingdom............ 6958/73

[52] U.S. Cl............... 303/21 F; 137/627.5; 303/40; 303/68
[51] Int. Cl............................... B60t 8/12
[58] Field of Search............. 303/21 F, 61–63, 303/68–69, 40, 9, 13; 188/181 A, 170; 137/627.5

[56] References Cited
UNITED STATES PATENTS

| | | | |
|---|---|---|---|
| 3,521,934 | 7/1970 | Leiber | 303/21 F |
| 3,743,362 | 7/1973 | Neisch | 303/21 F |
| 3,744,853 | 7/1973 | Cullen et al. | 303/21 F |
| 3,754,794 | 8/1973 | Durand | 303/21 F |

*Primary Examiner*—Trygve M. Blix
*Assistant Examiner*—Douglas C. Butler
*Attorney, Agent, or Firm*—Scrivener Parker Scrivener and Clarke

[57] ABSTRACT

In an anti-skid air braking system an air-operated diaphragm valve is arranged to close a connection between the chambers of an air actuator and supply air to the high pressure chamber when the brakes are applied. A flow restrictor delays the release of air from the low pressure chamber when the brakes are released, and the back pressure in the actuator is arranged to act on the diaphragm of the valve to oppose reconnection of the actuator to the supply.

8 Claims, 2 Drawing Figures

FIG.1.

CONTROL VALVE FOR ANTI-SKID AIR BRAKING SYSTEM

This invention relates to control valve assemblies for incorporation in an air operated braking system of the kind in which a brake on at least one wheel of a vehicle is applied by an actuator supplied with air under pressure controlled by a pedal operated valve and skid control means are included for reducing the differential air pressure applied across a movable wall in the actuator when the deceleration of the wheel exceeds a predetermined value.

According to the present invention a control valve assembly for incorporation in an air braking system of the kind set forth comprises a first valve controlling communication through a first valve seat located in a housing between an inlet and a first outlet adapted to be connected respectively to an air supply and to the high pressure side of the actuator, the first valve being normally held closed by a spring; a second valve controlling communication through a second valve seat located between the first outlet and a second outlet adapted to be connected to the low pressure side of the actuator; and a pressure responsive member which has opposed areas and which is arranged to close the second valve and open the first valve when fluid under pressure is applied to one of said areas, the second of said areas being exposed to the pressure in the first outlet, whereby, in use, the skid control means are adapted to control the pressure acting on the first area of the pressure responsive member so that the first valve closes and the second valve opens when the deceleration of the braked wheel exceeds the predetermined value.

Preferably the second valve seat is included in the first valve, the two valves being relatively movable. The second valve may be a diaphragm valve.

It is convenient for the control valve assembly to include a third, solenoid valve for controlling the supply of fluid under pressure to the diaphragm of the second valve.

The valve assembly may also include a passage between the inlet and a space above the diaphragm whereby the first valve is opened as soon as air under pressure is supplied to the inlet. Preferably the third valve controls this passage and a third outlet in the housing leading from the passage to atmosphere. Normally the third outlet is closed and the passage is open but when the solenoid valve is energised, the passage is closed and the second outlet opened.

Alternatively the valve assembly may include a separate second inlet leading to the third valve and adapted to be connected to the treadle valve.

This invention also relates to air operated braking systems of the kind set forth incorporating a control valve assembly as set out above.

According to this aspect of the invention the low pressure side of the actuator in such a braking system is provided with a flow restrictor leading to atmosphere.

An advantage of this arrangement over a system in which air is dumped from the actuator, is that on operation of the skid control means the air supply to the high pressure side of the actuator is cut-off and the two sides of the actuator are interconnected, equalizing the pressure across the movable wall and relieving the braking effort. Therefore the response time of the system is improved and, when the skid control means allows the air supply to be connected with the actuator to re-apply the brake, the air pressure will be acting against the air on the low pressure side of the actuator so the effective pressure applied to the brake is less than when the brake was applied originally.

Furthermore the pressure on the low pressure side of the actuator can be arranged to act on the first and second valves and this back pressure will have the effect of opposing the fluid acting on the pressure responsive member tending to close the second valve and open the first valve thus delaying the reapplication of the brake after the first valve has been closed during a skid.

Examples of control valve assemblies according to this invention are illustrated in the accompanying drawings in which.

Figure 1:
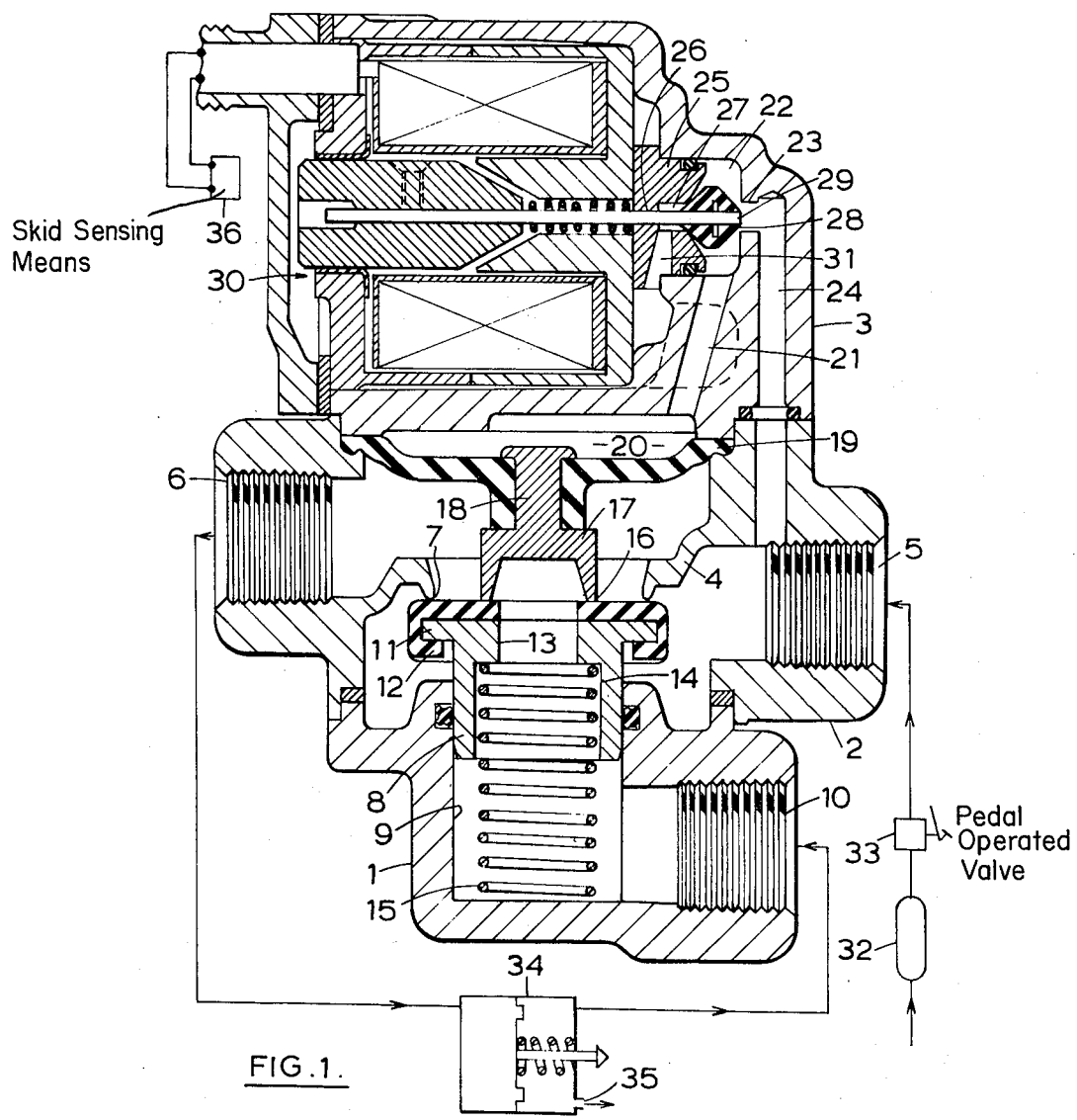
FIG. 1 is a section through a valve assembly connected in a braking system.

The control valve assembly comprises a housing constructed mainly from three co-operating sections 1, 2, 3. The middle or intermediate section 2 has a central web 4 separating an inlet 5 and an outlet 6 arranged respectively below and above the web and opposite each other. A valve seating 7 is formed by a downwardly facing annular portion of the web 4 surrounding an opening through the web. Co-operating with seating 7 is a cylindrical valve member 8 which is slidably and sealingly guided in an axial bore 9 in the lower housing section 1. A second outlet 10 leads transversely from the lower end of the bore 9. A radial flange 11 projects from the upper end of valve member 8 and serves to retain an annular sealing member 12 over the upper surface of the valve member. An axial bore 13 in the valve member 8 is counterbored at 14, the step at the change in diameter serving to retain a spring 15 acting between the valve member and the wall of the housing and normally urging the sealing member 12 into engagement with the seating 7.

An annular portion of the sealing member 12 surrounding the bore 13 forms a seating for a downwardly facing annular rim 16 projecting from the head 17 of a second valve member 18 which is carried by a flexible diaphragm 19 forming a seal between mating faces of housing sections 2 and 3. Thus the second valve member 18 controls flow between the first and second outlets 6 and 10.

A recess in the adjacent wall of upper housing section 3 forms a chamber 20 above the diaphragm. A passage 21 in the side wall of housing section 3 leads from chamber 20 to an inwardly facing recess 22. An opening 23 in the base of the recess 21 leads to a second passage 24 which extends through both housing section 3 and 2 to connect with inlet 5. The open end of recess 22 is closed by a plug 25 sealingly engaging the sides of the recess. An axial bore 26 in the plug is counterbored at 27 and the end of the counterbore forms a seating for a valve head 28 carried by a rod 29 extending through bore 26. Rod 29 is operated by a solenoid device 30 retained in the upper housing section 3 and is spring-loaded so that the valve head is normally in engagement with the seating in the plug 25. When the solenoid is energised the valve head is urged into engagement with a seating surrounding the opening 23. A radial passage 31 in the plug 25 leads from counterbore 27 to a space in the housing open to the atmosphere. Therefore, the inlet 5 is normally connected to the chamber 20 but when the solenoid is energised chamber 20 is isolated from the inlet and exhausted to atmosphere.

In an air operated anti-skid braking system for a vehicle a reservoir 32 of pressurised air is connected to inlet 5 of the valve assembly via a pedal-operated valve 33, and the outlet 6 is connected to the high pressure side of a diaphragm brake actuator, indicated diagrammatically at 34. The outlet 10 is connected to the low pressure side of the actuator which is equipped with a flow restrictor 35 leading to atmosphere. The solenoid device 30 is connected to means 36 sensing the deceleration of the braked wheel and capable of providing an electrical signal to energise the solenoid when the deceleration exceeds a predetermined value.

Normally the first valve 8 is closed so there is no communication between inlet 5 and outlet 6 but as soon as air is applied to the inlet by the pedal valve, it acts on diaphragm 19 via passages 24 and 21 to force the second valve 18 into engagement with the first valve which is moved away from seating 7 against the action of spring 15. Thus air is allowed into the high pressure side of the actuator 34 to apply the brake. The under side of diaphragm 19 is exposed to the supply pressure but on account of the central valve member 18 the area of the upper side of the diaphragm is larger so there is a net downward force.

In the event of skid signal energising the solenoid 30, chamber 20 is vented and the net force on the diaphragm acts upwardly allowing the first valve to close and then causing the second valve to open. This cuts off the air supply to the actuator and connects the high and low pressure sides of the actuator, equalising the pressure across the diaphragm and so relieving the braking pressure.

when the skid signal terminates, supply pressure is again applied to diaphragm 19 but now the supply pressure has to oppose the pressure remaining in the actuator acting over the full area of the diaphragm. The size of restrictor 35 is so chosen that the rate of pressure decay on the low pressure side of the actuator is slow compared with rate of pressure build up when the second valve opens so that the pressure in the actuator at the end of a skid signal can be approximately 50% of the supply pressure. The second valve will shut relatively quickly but the first valve will not open so quickly nor as fully as normal on account of this back pressure and the pressure drop through the valve will be greater than normal so that air pressure supplied to the brakes will be less than normal. In addition this reduced supply pressure will have to act against the pressure remaining on the low pressure side of the actuator. The rate of air escape through restrictor 35 does not increase linearly with the pressure increase on the high pressure side of the actuator so that forward movement of the diaphragm compresses the air on the low pressure side to reduce the pressure differential across the diaphragm. Both these effects result in a greatly reduced braking pressure being applied on the second cycle of the anti-skid operation. There will be corresponding reductions in effective braking pressures through the third and subsequent cycles for as long as the skid conditions persist.

Arranging for the pressure on the low pressure side of the actuator to resist opening of the first valve has the following effects:

1. The length of the delay in opening the first valve depends on the value of this back pressure. Thus if the back pressure is high, e.g. in a skid on ice the two sides of the actuator would be interconnected for a considerable time, opening of the first valve is delayed longer than if the back pressure is low.
2. When the first valve does open, operation of the actuator increases the back pressure to slow down the opening of the valve i.e. the rate of increase of differential pressure across the actuator diaphragm is reduced.
3. Over successive cycles the opening of the first valve balances at a pressure below the supply pressure, and at this balance pressure the rate of air entering the actuator equals the rate air leaks through restrictor 35.

The advantage of reducing the available braking pressure in skid conditions is that there is less likelihood of a skid re-occurring due to over pressurising the actuator after the braking pressure has been relieved once. Also in subsequent cyles less effective braking pressure has to be relieved therefore improving the response time of the system and also reducing the amount of air used during anti-skid oepration. Normal braking will be resumed more quickly with the present system than with a simple dump system.

In some vehicles the air compressor and reservoir 32 are at the rear and the treadle valve is at the front so that, if a valve assembly is adjacent a rear brake actuator, the supply line to the actuator is almost twice the length of the vehicle. Therefore it has been found advantageous to connect the reservoir direct to the valve assembly which considerably reduces the volume of air being moved during a brake application.

Figure 2:
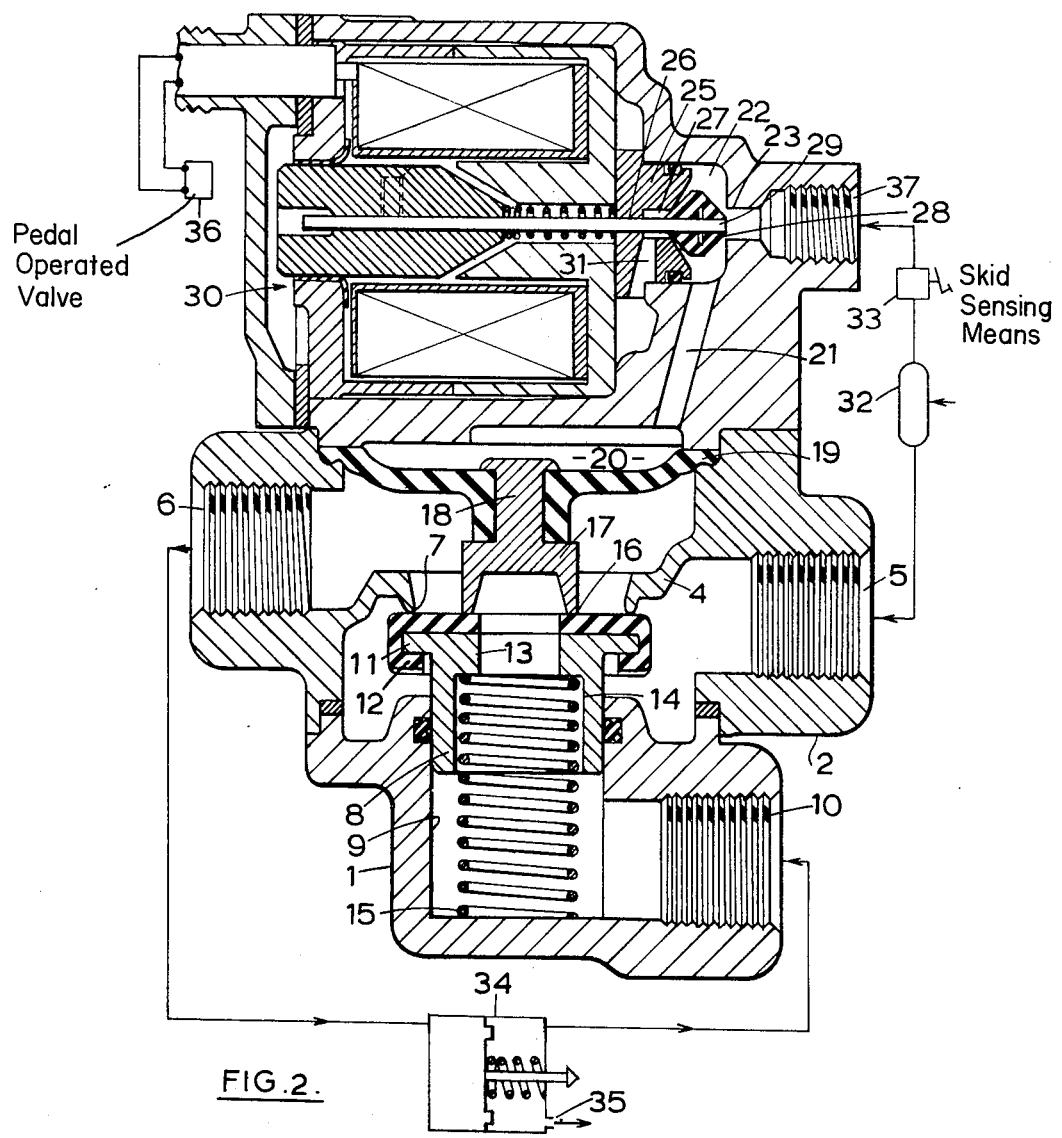
FIG. 2 is similar to FIG. 1 but showing a modified valve assembly.

FIG. 2 shows how the valve assembly is modified for this arrangement. Passage 23 is omitted and a third inlet 37 in housing part 33 enables the treadle valve to be connected directly to recess 22.

I claim:

1. In an air braking system comprising a brake for a wheel of a vehicle, an actuator including a high pressure chamber and a low pressure chamber on opposite sides of a movable wall for applying said brake, a supply of air under pressure, a pedal-operated valve controlling the flow of air from said supply to said high pressure chamber of said actuator, skid sensing means for supplying a signal when the deceleration of said braked wheel exceeds a predetermined value, and skid control means for reducing the differential pressure across said movable wall in response to said signal; a control valve assembly comprising a housing having an inlet connected to said air supply, a first outlet connected to said high pressure chamber, and a second outlet connected to said low pressure chamber, a first valve seat located in said housing between said inlet and said first outlet, a first valve controlling communication through said first valve seat, a spring acting on said first valve so that said first valve is normally closed, a second valve seat located in said housing between said first and second outlets, a second valve controlling communication through said second valve seat, a pressure responsive member controlling said valves, said pressure responsive member having first and second opposed areas and arranged to open said first valve and close said second valve in response to increased fluid pressure acting on said first area, said first area being acted upon by fluid pressure under the control of said skid control means which is arranged to reduce said pressure acting on said first area in the event of a skid signal to close said first valve and open said second valve, and said second area of said pressure responsive member being exposed to pressure in said first outlet to oppose re-opening of said first valve on cessation of said skid signal.

2. In an air braking system according to claim 1, said control valve assembly wherein said second valve seat is included in said first valve, the two valves being relatively movable.

3. In an air braking system according to claim 2, said control valve assembly wherein said pressure responsive member is a diaphragm secured to the second valve.

4. In a braking system according to claim 3, said control valve assembly wherein said first area of said diaphragm is larger than said second area and is remote from said first valve.

5. An air braking system according to claim 2 wherein said low pressure chamber of said actuator is provided with a flow restrictor leading to atmosphere, whereby fluid pressure acting on said first area of said pressure responsive member tends to close said second valve in opposition to fluid pressure in said actuator, and then tends to open said first valve in opposition to fluid pressure in said high pressure chamber acting on said second area of said pressure responsive member and in opposition to fluid pressure in said low pressure chamber acting on said second valve.

6. A braking system according to claim 5, wherein said skid control means comprises a third valve incorporated in said control valve assembly and adapted to be activated by said skid sensing means.

7. A braking system according to claim 6, wherein said treadle valve is connected to the inlet of said control valve assembly and said inlet is connected to said first area of said pressure responsive member through said third valve.

8. A braking system according to claim 6 wherein said treadle valve is connected to said first area of said pressure responsive member through said third valve.

* * * * *